United States Patent
Nomiyama

(10) Patent No.: US 7,444,351 B1
(45) Date of Patent: Oct. 28, 2008

(54) SYSTEMS, METHODS AND COMPUTER PRODUCTS FOR NAME DISAMBIGUATION BY USING PRIVATE/GLOBAL DIRECTORIES, AND COMMUNICATION CONTEXTS

(75) Inventor: Hiroshi Nomiyama, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/958,868

(22) Filed: Dec. 18, 2007

(51) Int. Cl.
 *G06F 7/00* (2006.01)
 *G06F 17/00* (2006.01)
(52) U.S. Cl. .................................... 707/102
(58) Field of Classification Search ........................ None
 See application file for complete search history.

(56) References Cited

U.S. PATENT DOCUMENTS

| | | | | |
|---|---|---|---|---|
| 6,738,462 | B1 * | 5/2004 | Brunson | 379/142.06 |
| 7,043,690 | B1 * | 5/2006 | Bates et al. | 715/234 |
| 2003/0158855 | A1 * | 8/2003 | Farnham et al. | 707/102 |
| 2006/0059123 | A1 | 3/2006 | Klein | |

* cited by examiner

*Primary Examiner*—Christian P. Chace
*Assistant Examiner*—Michael J Hicks
(74) *Attorney, Agent, or Firm*—Cantor Colburn LLP; Vazken Alexanian

(57) ABSTRACT

Name disambiguation by using private/global directories and communication contexts. Exemplary embodiments include a name disambiguation method, including identifying a plurality of names of persons in text received in the computer system, each of the plurality of names including a start and an end position, a family name and a given name, for each of the plurality of names of persons in the text, retrieving personal identification information from a global directory as a candidate for a name match, retrieving personal identification information from a private directory as a candidate for the name match, comparing the private directory personal identification information with the global directory personal identification information, eliminating the personal identification information from the private directory, retrieving frequencies of communications associated with the personal identification information from the private directory and displaying related information for each of the plurality of names of persons in the text.

1 Claim, 3 Drawing Sheets

US 7,444,351 B1

SYSTEMS, METHODS AND COMPUTER PRODUCTS FOR NAME DISAMBIGUATION BY USING PRIVATE/GLOBAL DIRECTORIES, AND COMMUNICATION CONTEXTS

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates to name disambiguation, and particularly to systems, methods and computer products for name disambiguation by using private/global directories and communication contexts.

2. Description of Background

Online communication tools, such as e-mails, instant messaging, electronic bulletin boards, and blogs, are commonly used in enterprises for daily works. Even though such communications includes rich information for relationships among persons and knowledge about persons, there are few functions in such tools using results of social network analysis and text analysis. For example, if a name in text is disambiguated automatically, the result will be used for various useful functions in online communication tools, which support/accelerate/enrich online communications.

Some research has been done for a task to identify specific persons appeared in texts, which is known as name disambiguation, name resolution, or name identification. Conventional techniques disambiguate names in a text of a mail body by using relationships expressed in mail archives. At first, person names (ex. "Susan") in the mail body are recognized, and a set of specific "Susan"s with whom the sender has communicated. And scores for each candidate are calculated based on relationships (such as sender-only or sender+recipients), time scales (daily, weekly, and so on), and so on. Other techniques use k-way spectral clustering method by representing mail archives as a graph structure. Other techniques focus on name variations, such as name abbreviations, name misspellings. Still other techniques use organization information, which uses names in texts for disambiguation of person names. However, the techniques do not disambiguate names by using plural persons included in the body of the same mail, and assume that global mail archives (not a private mail box) are available, which are very difficult to get because of security and privacy matters.

SUMMARY OF THE INVENTION

Exemplary embodiments include a name disambiguation method, including identifying a plurality of names of persons in text received in the computer system, each of the plurality of names including a start and an end position, a family name and a given name, for each of the plurality of names of persons in the text, retrieving personal identification information from a global directory as a candidate for a name match, retrieving personal identification information from a private directory as a candidate for the name match, comparing the private directory personal identification information with the global directory personal identification information, in response to an inability to obtain the name match with the personal identification information from the private directory eliminating the personal identification information from the private directory, in response to a determination that there still exists ambiguous names in the plurality of names, retrieving frequencies of communications associated with the personal identification information from the private directory and displaying related information for each of the plurality of names of persons in the text.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution in which systems and methods can disambiguate names using only the private information in the private environments with keeping their security and privacy. The systems and methods described herein include a global directory which and can be applied effectively in business environments in which online communication tools, such as mails, instant messaging, are commonly used for daily works.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

In exemplary embodiments, the systems and methods described herein disambiguate person names in texts in online communications, such as e-mails, instant messaging, electronic bulletin board, or blogs. The systems and methods described herein support/enrich/accelerate communications by using results of name disambiguation.

Figure 1:
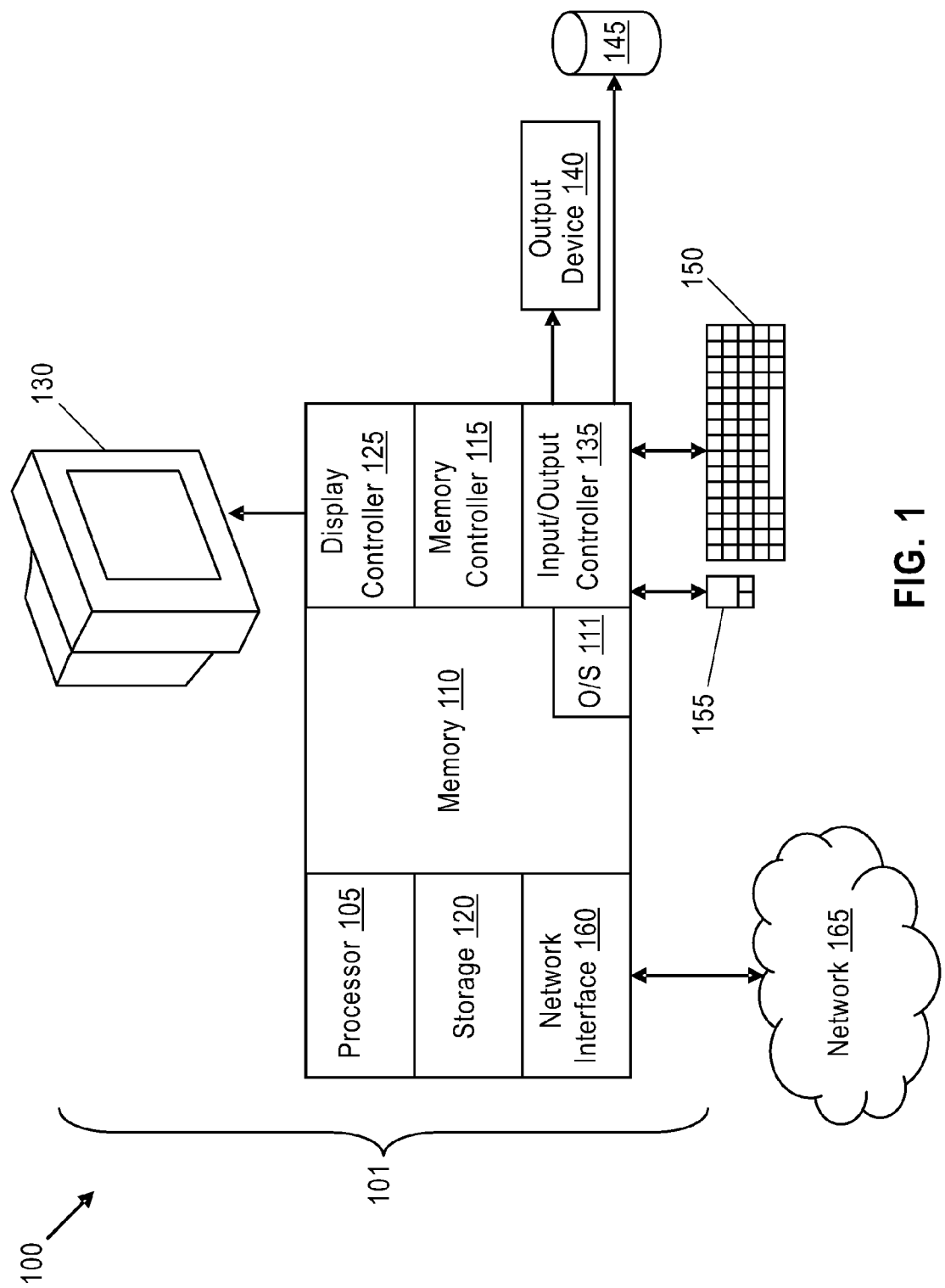
FIG. 1 illustrates an exemplary embodiment of a system for name disambiguation by using private/global directories and communication contexts.

FIG. 1 illustrates an exemplary embodiment of a system 100 for name disambiguation by using private/global directories and communication contexts. The methods described herein can be implemented in software (e.g., firmware), hardware, or a combination thereof. In exemplary embodiments, the methods described herein are implemented in software, as an executable program, and is executed by a special or general-purpose digital computer, such as a personal computer, workstation, minicomputer, or mainframe computer. The system 100 therefore includes general-purpose computer 101.

In exemplary embodiments, in terms of hardware architecture, as shown in FIG. 1, the computer 101 includes a processor 105, memory 110 coupled to a memory controller 115, and one or more input and/or output (I/O) devices 140, 145 (or peripherals) that are communicatively coupled via a local input/output controller 135. The input/output controller 135 can be, for example but not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 105 is a hardware device for executing software, particularly that stored in memory 110. The processor 105 can be any custom made or commercially available processor, a central processing unit (CPU), an auxiliary processor among several processors associated with the computer 101, a semiconductor based microprocessor (in the form of a microchip or chip set), a macroprocessor, or generally any device for executing software instructions.

The memory 110 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 110 may incorporate electronic, magnetic, optical, and/or other types of storage media. Note that the memory 110 can have a distributed architecture, where various components are situated remote from one another, but can be accessed by the processor 105.

The software in memory 110 may include one or more separate programs, each of which comprises an ordered listing of executable instructions for implementing logical functions. In the example of FIG. 1, the software in the memory 110 includes the name disambiguation methods described herein in accordance with exemplary embodiments and a suitable operating system (O/S) 111. The operating system 111 essentially controls the execution of other computer programs, such the name disambiguation systems and methods described herein, and provides scheduling, input-output control, file and data management, memory management, and communication control and related services.

The name disambiguation methods described herein may be in the form of a source program, executable program (object code), script, or any other entity comprising a set of instructions to be performed. When a source program, then the program needs to be translated via a compiler, assembler, interpreter, or the like, which may or may not be included within the memory 110, so as to operate properly in connection with the O/S 111. Furthermore, the name disambiguation methods can be written as an object oriented programming language, which has classes of data and methods, or a procedure programming language, which has routines, subroutines, and/or functions.

In exemplary embodiments, a conventional keyboard 150 and mouse 155 can be coupled to the input/output controller 135. Other output devices such as the I/O devices 140, 145 may include input devices, for example but not limited to a printer, a scanner, microphone, and the like. Finally, the I/O devices 140, 145 may further include devices that communicate both inputs and outputs, for instance but not limited to, a NIC or modulator/demodulator (for accessing other files, devices, systems, or a network), a radio frequency (RF) or other transceiver, a telephonic interface, a bridge, a router, and the like. The system 100 can further include a display controller 125 coupled to a display 130. In exemplary embodiments, the system 100 can further include a network interface 160 for coupling to a network 165. The network 165 can be an IP-based network for communication between the computer 101 and any external server, client and the like via a broadband connection. The network 165 transmits and receives data between the computer 101 and external systems. In exemplary embodiments, network 165 can be a managed IP network administered by a service provider. The network 165 may be implemented in a wireless fashion, e.g., using wireless protocols and technologies, such as WiFi, WiMax, etc. The network 165 can also be a packet-switched network such as a local area network, wide area network, metropolitan area network, Internet network, or other similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 101 is a PC, workstation, intelligent device or the like, the software in the memory 110 may further include a basic input output system (BIOS) (omitted for simplicity). The BIOS is a set of essential software routines that initialize and test hardware at startup, start the O/S 111, and support the transfer of data among the hardware devices. The BIOS is stored in ROM so that the BIOS can be executed when the computer 101 is activated.

When the computer 101 is in operation, the processor 105 is configured to execute software stored within the memory 110, to communicate data to and from the memory 110, and to generally control operations of the computer 101 pursuant to the software. The name disambiguation methods described herein and the O/S 111, in whole or in part, but typically the latter, are read by the processor 105, perhaps buffered within the processor 105, and then executed.

When the systems and methods described herein are implemented in software, as is shown in FIG. 1, it the methods can be stored on any computer readable medium, such as storage 120, for use by or in connection with any computer related system or method. In the context of this document, a computer readable medium is an electronic, magnetic, optical, or other physical device or means that can contain or store a computer program for use by or in connection with a computer related system or method. The name disambiguation methods described herein can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In exemplary embodiments, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic)

having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In exemplary embodiments, where the name disambiguation methods are implemented in hardware, the name disambiguation methods described herein can implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

In exemplary embodiments, one or more processes in the memory 110 can monitor activity from the keyboard 150 and the mouse 155 or a combination thereof. The processes can further monitor long-running jobs that have been initiated on the computer 101. The processes can further monitor which and how many other machines can control the computer 101 either locally or remotely. In exemplary embodiments, the processes can also inquire or accept a grace period input by a user of the computer 101. The grace period can be a time period after which all traffic to and from the computer ceases if no further activity has been sensed by the processes. In this way, if a user has left the computer 101 for an extended period of time or has left the computer (e.g., after a work day) the computer 101 no longer allows traffic to and from the computer 101. In an alternative implementation, the computer 101 can totally power down after the grace period has expired. In further exemplary embodiments, the processes can accept traffic only from a common network maintenance control system that provides limited services.

Figure 2:
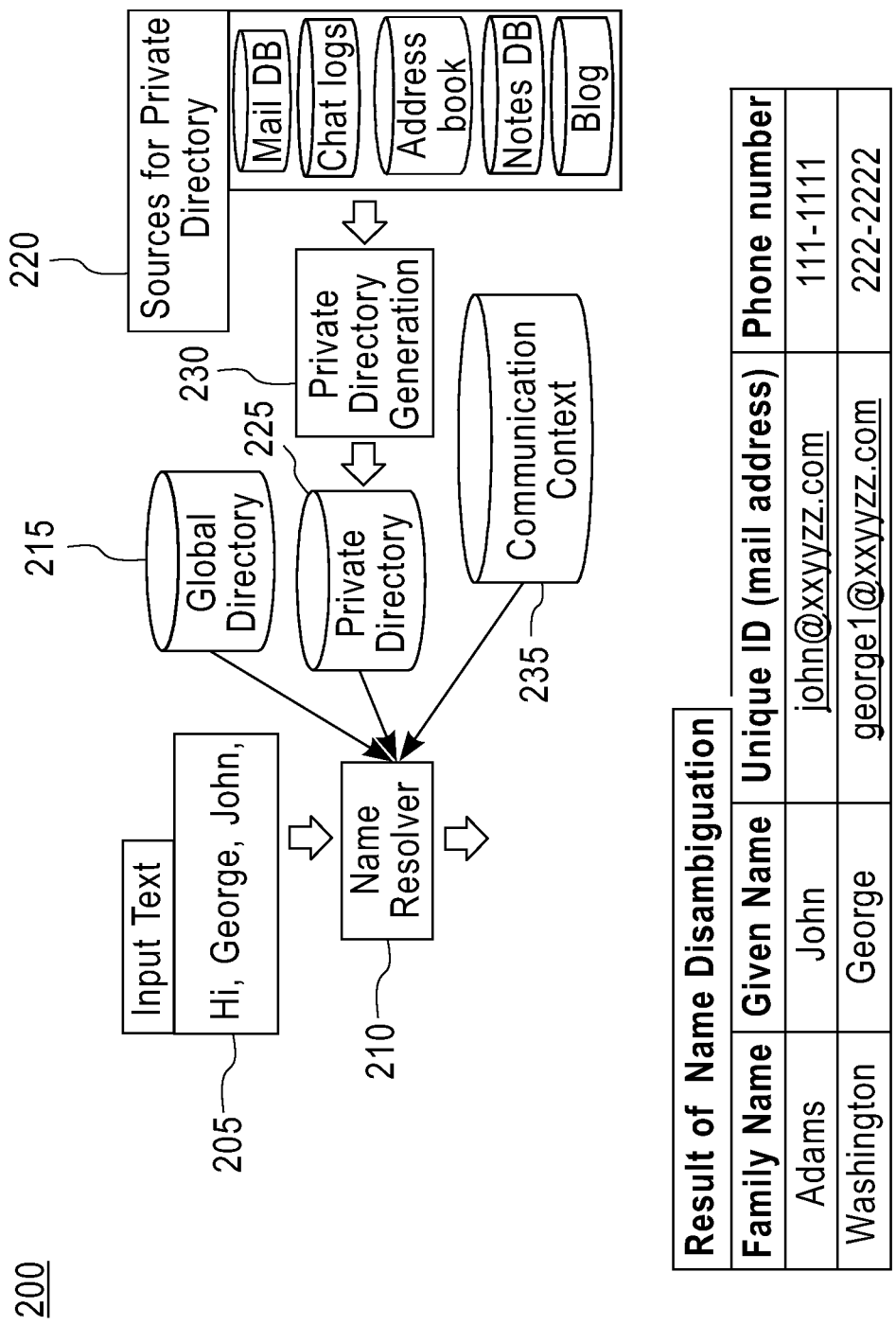
FIG. 2 illustrates a system level block diagram for name disambiguation in accordance with exemplary embodiments.

A system level block diagram of a name disambiguation system 200 is shown in FIG. 2. The system 200 includes input text 205 coupled to a name resolver 210, which is a process to disambiguate persons for person names found in the input text 205 (i.e., identify a personal id for a person name in the input text), and display related personal information for the disambiguated persons and related persons for disambiguated persons. The system 200 further includes a global directory 215, which includes personal information of an organization, such as a personal id, family name, given name, and other information (phone number, division, title, and so on). A personal id is a unique id to specify a specific person, such as an employee number, a mail address. In exemplary embodiments, an Internet mail address can be used for a personal id. The global directory 215 is used to search personal information for the specified person with queries such as family name+given name, family name, given name, or personal id. The global directory 215 can also include a hierarchical structure of an organization, which is used to get organizational distance between the specified personal ids. The system 200 can further include sources for a private directory 220, which can include data sources such as communication contents or logs such as e-mail databases, instant messaging, address books, electronic bulletin boards, and blogs. The private directory 225 is information about all the communications of a user, which are obtained from sources of a private directory, which includes each communication stored in sources for the private directory. In exemplary embodiments, personal ids are assigned for specific persons in each communication (e.g., personal ids of senders or recipients for e-mails). The system 200 can further include a private directory generation 230, which is a process to generate a private directory from sources for private directory. In exemplary embodiments, a communication context 235 is a context where online communication tools are used. This includes personal ids of persons who are communicating, and keywords in the communication context. In an e-mail, for example, addresses in "To"/"From"/"Bcc", texts in the mail body, keywords extracted from the text are included in the communication context.

Figure 3:
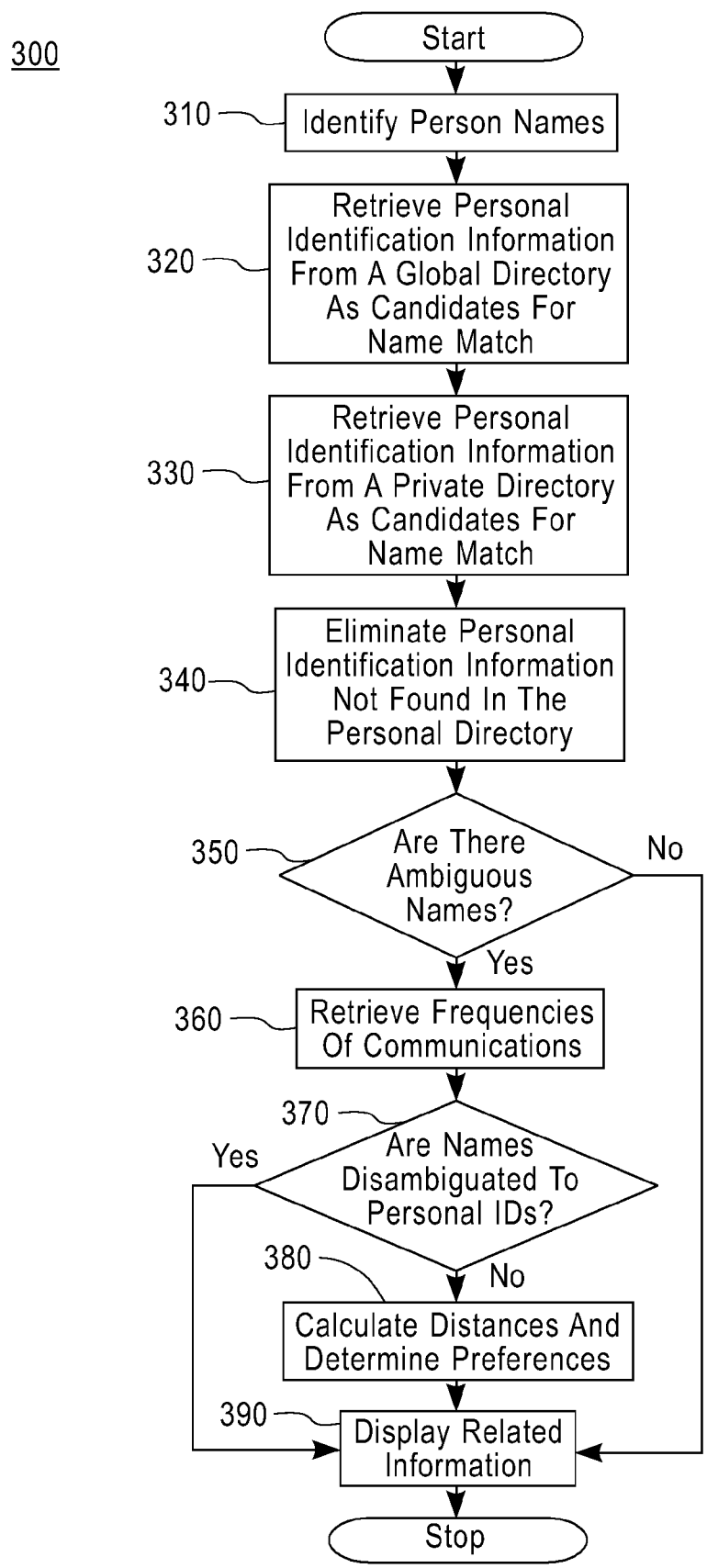
FIG. 3 illustrates a flowchart of a name disambiguation method in accordance with exemplary embodiments.

FIG. 3 illustrates a flowchart of a name disambiguation method 300 in accordance with exemplary embodiments. At block 310, the method 300 identifies person names in texts. To recognize person names in texts by using a named entity recognition module. A range of a person name (start position and end position in the text), a family name, and a given name, are recognized in this step. For example, a result of the named entity recognition for "George Washington" is as follows: Start Position=0, End Position=16, Family_Name="Washington", and Given_Name="George". In exemplary embodiments, known technologies are applicable for named entity recognition. At block 320, to obtain a set of personal ids for person names recognized at block 310, by referring the global directory, if both of a family name and given name are recognized for a person name, then a query both with a family name and a given name is used for search (ex. Family_Name="Washington" and Given_Name="George"). If only a family name or a given name is recognized, then a query with the obtained name is used (ex. Given_Name=?"George"). At step 330, personal identification information is retrieved from personal directories. Personal ids which cannot be found in the private directory are eliminated from the candidates at block 340. At block 350, the method 300 determines if there are still ambiguous names among the candidates. If there are still ambiguous names, then at block 360, to search communications which includes personal ids exists in the private directory, and if some communications exists, then get frequencies of communications for each personal id. A query is used to search the private directory. At first, for each person name, if there are multiple candidates of personal ids for a person name, then all the personal ids are concatenated with "OR" operators. And all the queries for person names are concatenated with "AND" operators. If there is a communication context available, personal ids from the communication context are additionally concatenated with "AND" operators. Examples of personal ids obtained from the communication context are: E-mails—Personal ids obtained from "To"/"Cc"/"Bcc" and Instant messaging—Personal ids for persons with whom a user is communicating. If there are no further ambiguous names at block 350, then at block 390 related information is displayed. Related information can include a division name, a title, a phone number, for each personal id obtained from the global directory. If there are still multiple candidates for a person name, then candidates are sorted by their frequencies calculated at block 360 and preferences calculated at block 380.

If there are multiple candidates for a person name, and frequencies of some candidates are greater than zero, then candidates with zero frequencies are eliminated from the candidates. At block 370, if all person names are disambiguated uniquely into unique personal ids, then at block 390, related information is displayed. At block 370, if the person names are not disambiguated, and if there still multiple candidates of personal ids exist for a person name, then at block

380, distances between each candidate and a user are calculated by using the global directory. Calculated distances are used for their preferences.

An example of name disambiguation for a text "Hi George, John" is described. In this example, a company-wide phone directory, which includes various kinds of personal information, is used for the global directory, and a mail box for a user is used for a source of a private directory. A personal id is an internet mail address. Two person names in the input text, "George" (a given name) and "John" (a given name), are recognized by the named entity recognition module. Personal ids for "George" and "John" are obtained from the global directory by queries Given_Name="George" and Given_Name="John" respectively.

| "George" (a give name) | 648 | (george@xxyyzz.com, george1@xxyyzz.com, . . . ) |
| "John" (a given name) | 24 | (john@xxyyzz.com, john1@xxyyzz.com, . . . ) |

It is assumed that there are 648 persons whose given name is George, and 24 persons whose given name is John. Sets of personal ids which exist in the private directory are obtained for "George" and "John".

| "George" (a given name) | 4 | george1@xxyyzz.com, george2@xxyyzz.com, george3@xxyyzz.com, george4@xxyyzz.com, |
| "John" (a given name) | 1 | john@xxyyzz.com |

It is assumed that there are 4 "George"s and 1 "John" in the private directory. The following query is searched against the private directory.

> john@xxyyzz.com AND (george1@xxyyzz.com OR george2@xxyyzz.com OR george3@xxyyzz.com OR george4@xxyyzz.com)

It is assumed there are 21 communications (21 e-mails) found in the private directory. Frequencies of each personal id from 21 communications are counted, and personal ids with zero frequency are eliminated from the candidates.

| john@xxyyzz.com | 21 |
| george1@xxyyzz.com | 21 |
| | Eliminated from the candidates |
| | Eliminated from the candidates |
| | Eliminated from the candidates |

Three personal ids, george2@xxyyzz.com, george3@xxyyzz.com, and george4@xxyyzz.com, do not appear in 21 communications, so they are eliminated from the candidates. Additional information is obtained for disambiguated personal ids. Personal information for disambiguated personal ids is obtained from the global directory.

| john@xxyyzz.com | John Adams | 111-1111 |
| george1@xxyyzz.com | George Washington | 222-2222 |

Information about related personal ids obtained from the private directory is also obtained from the global directory. Related personal ids are personal ids which are included communications obtained Step 5. The list of related personal ids is sorted by their frequencies. Unique id Family_Name Given_Name Phone# # of Communications

| Unique id | Family_Name | Given_Name | Phone # | # of Communications |
|---|---|---|---|---|
| thomas@xxyyzz.com | Thomas | Jefferson | 333-3333 | 10 |
| james@xxyyzz.com | James | Madison | 444-4444 | 1 |

There are several examples for which the systems and methods described herein can be implemented, as now described. In one example, automatic completion of addresses from a text in a mail body, and display of related persons can be implemented. The results of name disambiguation from a text in the mail body are automatically put into "To" addresses by using this method if personal ids are uniquely identified. And the related persons extracted for disambiguated personal ids will be showed as candidates for adding their addresses into "Cc" or "Bcc". The personal information for those persons, such as full names, phone numbers, or communication histories may be displayed for reference.

In another example, personal information can be displayed during a chat. In a chat communication, a person names in chat messages can be disambiguated by using communication context (a user and persons who are communicating). For example, a chat between "George" and "John", there may be a message "Why don't we invite Thomas into this chat?". If name disambiguation is successful for "Thomas", then the system can display personal information of "Thomas" to invite "Thomas" to the chat easily.

In another example, miss-spelling of person names can be detected. If there are person names for which no candidates are obtained by this method, then a warning will be displayed for candidates of miss-spelling of person names.

In another example, warning for mails to persons with whom the user has never communicated, or mails from persons with whom the user has never communicated can be displayed. In sending a mail, if there are no communications found in the private directory with persons in mail addresses of "To"/"Cc"/"Bcc", a warning message will be showed. There may be possibilities of wrong mail addresses. In reading a received mail, if there are no communications found in the private directory with persons in mail addresses of "To"/

"Cc"/"Bcc", a warning message can be displayed. In addition, the related information is displayed for persons in mail addresses of "To"/"Cc"/"Bcc" with different colors according to whether communications are found or not. No name disambiguation is necessary for this process.

In still another example, automatic completion of person names for reply mails can be implemented. Person names, such as "Hi George, John", are inserted at the top of the mail body automatically from "To" addresses (ex. To: george1@xxyyzz.com, john@xxyyzz.com). In this case, person names are obtained from the global directory. No name disambiguation is necessary for this process.

In another example, the systems and methods described herein can provide detection of persons who the user knows. If there are some persons in texts who uniquely identified by name disambiguation, they may be persons with whom the user has communicated, that means persons who the user knows. For example, a list of names in an intranet web site, such as a list of awarded persons, a user can easily find persons who he/she knows.

In another example, the systems and methods described herein can search for personal information in the global directory for a specific person. This method provides an efficient search for personal information for a specific person with whom the user has communicated. There may be many person whose given name is "George" in the global directory, but much less number of "George" with whom the user has communicated before, which are obtained by using this method. If there are still many "George"s whom the user knows, then by inputting the related person with "George" would reduce the number of candidates effectively.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. In a computer system, a name disambiguation method, comprising:
    identifying a plurality of names of persons in text received in the computer system, each of the plurality of names including a start and an end position, a family name and a given name;
    for each of the plurality of names of persons in the text;
        retrieving personal identification information from a global directory as a candidate for a name match;
        retrieving personal identification information from a private directory as a candidate for the name match;
        comparing the private directory personal identification information with the global directory personal identification information;
    in response to an inability to obtain the name match with the personal identification information retrieved from the private directory eliminating the personal identification information from the private directory as a name match candidate;
    in response to a determination that there still exists ambiguous names in the plurality of names, retrieving frequencies of communications associated with the personal identification information from the private directory;
    displaying related information for each of the plurality of names of persons in the text wherein displaying related information for each of the plurality of names of persons in the text comprises sorting candidates by the frequencies of communications; and further comprising, in response to a determination of multiple candidates of personal identification information from the private directory for one of the plurality of names in the text, using a hierarchical structure found in the global directory, which represents a hierarchical structure of an organization for which the global directory exists, to calculate an organizational distance between a user of the computer system and each candidate of the plurality of the names of persons in the text, and determining a best candidate based on the calculated organizational distances.

* * * * *